United States Patent [19]

Sherman, II

[11] Patent Number: 4,707,320

[45] Date of Patent: Nov. 17, 1987

[54] METHOD OF INJECTING MOLDING A UNIVERSAL JOINT

[75] Inventor: William E. Sherman, II, Granger, Ind.

[73] Assignee: Allied Corporation, Morristown, N.J.

[21] Appl. No.: 850,194

[22] Filed: Apr. 10, 1986

Related U.S. Application Data

[62] Division of Ser. No. 643,599, Aug. 23, 1984, Pat. No. 4,582,503.

[51] Int. Cl.⁴ .............................................. B29C 45/14
[52] U.S. Cl. ...................................... 264/242; 29/434; 29/525
[58] Field of Search ................ 264/242, 264; 403/132; 29/525, 460, 434

[56] References Cited

U.S. PATENT DOCUMENTS

| | | | |
|---|---|---|---|
| 1,705,731 | 3/1929 | Hufferd | 464/139 |
| 2,545,646 | 3/1951 | Blinkman | 464/139 |
| 2,954,992 | 10/1960 | Baker | 264/242 |
| 3,296,830 | 1/1967 | Runkle | 64/17 |
| 3,310,959 | 3/1967 | Sheppard | 464/139 |
| 3,324,681 | 6/1967 | Burns et al. | 29/434 |
| 3,764,647 | 10/1973 | McDow | 264/242 |
| 4,203,683 | 5/1980 | Rogers | 403/132 |
| 4,290,181 | 9/1981 | Jackson | 264/242 |
| 4,431,328 | 2/1984 | Smith | 403/132 |

*Primary Examiner*—Jan H. Silbaugh
*Assistant Examiner*—J. F. Durkin, II
*Attorney, Agent, or Firm*—Larry J. Palguta; Ken C. Decker

[57] ABSTRACT

An injection molded universal joint (10) includes a central retaining member (40) captured between spherical balls (30, 32, 34, 36) seated in bores (22, 24, and 26, 28) located in diametrically opposed arms (14, 16, and 18, 20) of respective shaft members (11, 12). The spherical balls are each pressed through an associated bore until a portion of the ball extends radially inwardly of the arm, and then maintained in position by a plastic material (80) insert molded into and retained in the bore. The insert molded plastic material (80) retains each of the spherical balls in place and permits the central retaining member (40) to be accurately positioned and with a predetermined preload applied to the universal joint (10).

6 Claims, 2 Drawing Figures

METHOD OF INJECTING MOLDING A UNIVERSAL JOINT

This is a division of application Ser. No. 643,599 filed Aug. 23, 1984 now U.S. Pat. No. 4582503.

The invention relates to an injection molded universal joint for use in a steering column.

Many automotive vehicles utilize a tilt steering wheel mechanism which may be adjusted according to the desire of the vehicle operator. Thus, the tilt steering wheel mechanism compensates for the wide variety in sizes of vehicle drivers and contributes significantly to the comfort of the driver during operation of the vehicle.

It is desirable to provide a universal joint for use in such a tilt steering mechanism, wherein the universal joint may be easily and inexpensively manufactured, while eliminating many of the problems of prior universal joint assemblies. The universal joint should be designed to require few components, simplified assembly, and enhanced reliability over previous universal joint designs. The universal joint should be able to withstand high load forces and yet be relatively small in size. It is preferable that the design solve the problems of adjustment caused by oscillating torque and movement of joint members under load forces. Additionally, it would be desirable if each axis of the universal joint could be set independently of the other and thus eliminate the matching of parts for the respective upper and lower yokes.

The invention comprises a universal joint having shaft members each terminating in a pair of diametrically opposed arms. Each arm has a through bore disposed oppositely from the bore in the other arm, with a spherical ball having been pressed through the bore until a portion of the spherical ball extends radially inwardly of the diametrically opposed arms. Located between the arms of each member is a central retaining member that is generally a square-shaped block. Located within four surfaces of the central retaining member are four hemispherical recesses for receiving the radially inwardly protruding portions of the spherical balls. The spherical balls are maintained in position by plastic material injection molded into the respective bores after the spherical balls have been press fitted therethrough. Each of the through bores may have a groove disposed about the bore so that injection molded plastic will extend into the groove and provide an anchoring means for retaining the molded plastic within the bore, or a snap ring may be inserted into the groove prior to injection molding so that after the molding is completed, the snap ring provides a secure radially inward extension that will anchor the plastic material in the respective bore.

The invention is described in detail below with reference to the drawings which illustrate an embodiment, in which.

Figure 1:
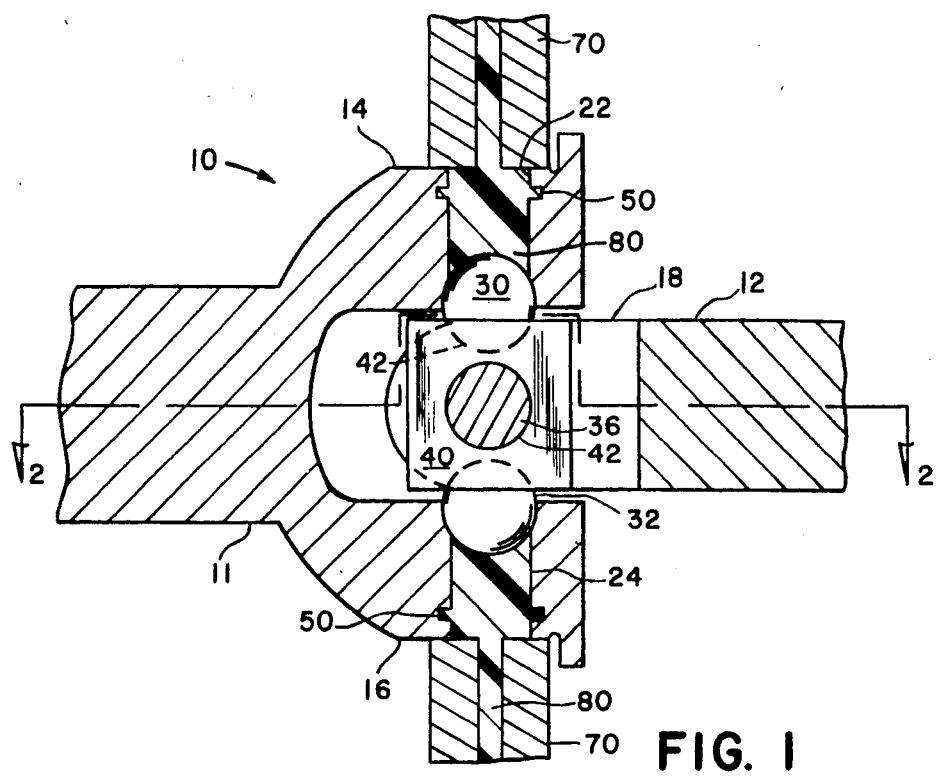
FIG. 1 is a cross section of the universal joint during the injection molding process.

Referring to the Figures, the universal joint is designated generally by reference numeral 10. Universal joint 10 includes a pair of rotatable members comprising a first shaft 11 and second shaft 12 having arms 14, 16 and 18, 20, respectivly, at ends thereof. Diametrically opposed bores 22 and 24 are located in arms 14 and 16 of first shaft 11, whereas diametrically opposed bores 26 and 28 are located in arms 18 and 20. It should be noted that the bores 22 and 24 of the first shaft 11 are centered in the same plane, with bores 26 and 28 of second shaft 12 located at right angles with respect thereto. Spherical balls 30, 32, 34, and 36 are press fitted through their associated bores until they extend radially inwardly of the associated arm. Located within the arms 14, 16 and 18, 20 is a central retaining member 40 which is generally square shaped and has a plurality of hemispherical seats 42 located in four surfaces thereof. Each of the hemispherical seats 42 contains a curvature of radius complementary to the curvature of radius of the spherical balls, and receives a ball therein so that the central retaining member 40 couples together first shaft 11 and second shaft 12. From the foregoing description, it is obvious that the shafts 11 and 12 are coupled together so that they may be rotated with their axes angularly disposed with respect to one another, and provide a universal joint suitable for use within a steering column.

Figure 2:
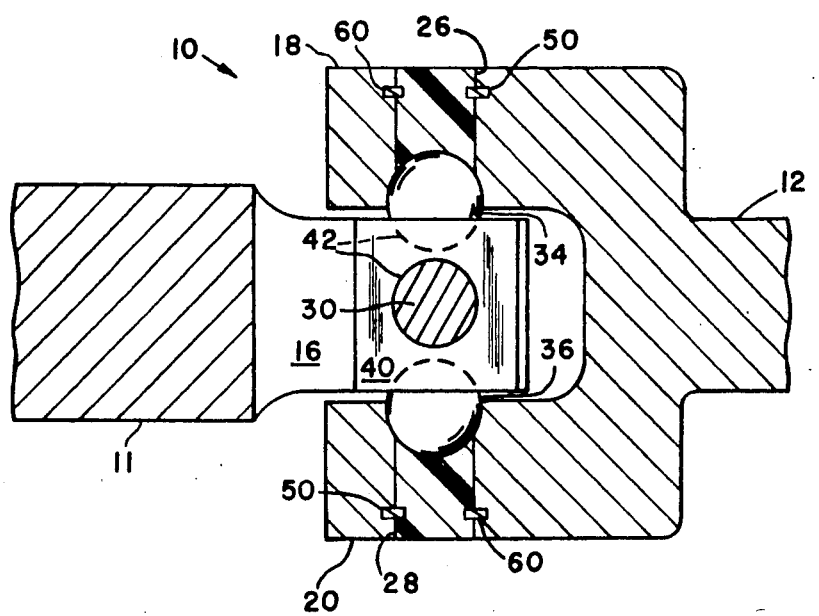
FIG. 2 is a cross section taken along view line 2—2 of FIG. 1 after assembly of the universal joint has been completed.

The spherical balls 30, 32, 34, and 36 are maintained within their associated bores by means of a plastic material which has been injection molded within the bores. Within each bore 22, 24 and 26, 28 is located an annular groove 50 that provides an anchoring recess for injection molded material so that the molded material will not be forced radially outwardly of the bores in arms 14, 16, 18, 20 during operation of the universal joint. Alternatively, washers or snap rings 60 (see FIG. 2) may be inserted into the grooves 50 prior to the injection molding process, whereby rings 60 extend radially inwardly of the bores and provide secure anchorings for the injection molded material.

FIG. 1 illustrates the method for injection molding the plastic material. The injector nozzles 70 contact opposed arms 14 and 16 and the plastic material 80 is injected directly into bores 22 and 24. There are many types of plastic materials that are suitable for use in the present invention, and an illustrative example would be a 30% glass-filled nylon such as Dupont's "Zytel" ®. Each shaft would be assembled separately with central retaining member 40, resulting in the position of central retaining member 40 being accurately established, and the preload of the arms effected by inward movement of the injector nozzles 70. Thus, the preloading of two arms of the joint is effected separately from the same procedure subsequently used for the two arms of the other shaft. This eliminates the required matching of upper and lower yoke parts in order to center the retaining member 40, as happens in the assembly of prior art universal joints. In addition, the central retaining member may be a solid, integral part instead of a pair of parts connected together by a bolt and nut. A torque adjustment may be effected by merely varying the press load of the ball, the pressure of the injected plastic, and the clamp load on the arms.

The present invention provides an assembly method which permits the preloading and retaining of components to produce a compact, high load, small universal joint with a resulting economy of components and assembly. The universal joint is stronger, consists of fewer parts, and does not have the inherent problem of mismatched parts.

Although this invention has been described in connection with the illustrated embodiment, it will be obvious to those skilled in the art that various changes may be made in the form, structure, and arrangement of parts without departing from the invention.

I claim:

1. A method for providing a lash-free universal joint, comprising the steps of (a) providing two rotatable members each having spaced-apart arms located at an end of the respective rotatable member, each arm having a through opening, (b) press fitting a ball into each of the openings such that the ball protrudes radially inwardly fromthe through opening of the respective spaced-apart arm, (c) disposing means for coupling the rotatable members together between the spaced-apart arms of each rotatable member, the coupling means having a plurality of seats each of which receives a protruding ball, (d) injection molding plastic material within the openings of a pair of spaced-apart arms of one rotatable member so that the coupling means is centered between the associated balls and spaced-apart arms and accurately positioned therebetween, the plastic material injected by means of nozzles that engage the pair of spaced-apart arms of the one rotatable member and the nozzles moving inward to effect a preloading of the respective arms which effects the positioning of the coupling means, and (e) injection molding plastic material into the openings of the spaced-apart arms of the other rotatable member so that the associated balls and coupling means are centered relative to the spaced-apart arms of the other rotatable member and the coupling means accurately positioned therebetween, the plastic material injected by means of nozzles which engage the pair of spaced-apart arms of the other rotatable member and the nozzles moving inward to effect a preloading of the respective arms which effects the positioning of the coupling means, the coupling means being centered between the spaced-apart arms of the rotatable members and the balls positioned by the plastic material and engaging the seats to provide lash-free movement in any direction.

2. The method in accordance with claim 1, further comprising the steps of providing reception means within each of the openings and disposing protrusion means into each reception means, the protrusion means protruding into each bore and anchoring said plastic material therein.

3. The method in accordance with claim 2, wherein the reception means comprises a groove and the protrusion means comprises a snap ring.

4. The method in accordance with claim 1, further comprising the step of providing reception means within each of the openings, the plastic material extending into the reception means and effecting anchoring of the plastic material within the opening.

5. The method in accordance with claim 4, wherein the reception means comprises a groove.

6. The method in accordance with claim 1, wherein the coupling means comprises a substantially square-shaped block having said seats disposed about the periphery thereof.

* * * * *